(12) United States Patent
Gonzalez-Martinez

(10) Patent No.: US 9,771,091 B1
(45) Date of Patent: Sep. 26, 2017

(54) RATCHET BINDER RACK

(71) Applicant: Manaen Gonzalez-Martinez, Hobart, IN (US)

(72) Inventor: Manaen Gonzalez-Martinez, Hobart, IN (US)

( * ) Notice: Subject to any disclaimer, the term of this patent is extended or adjusted under 35 U.S.C. 154(b) by 0 days.

(21) Appl. No.: 15/458,120

(22) Filed: Mar. 14, 2017

(51) Int. Cl.
*B62B 1/26* (2006.01)
*B62B 1/10* (2006.01)
*B60P 7/08* (2006.01)

(52) U.S. Cl.
CPC ............... *B62B 1/26* (2013.01); *B62B 1/10* (2013.01); *B60P 7/0807* (2013.01)

(58) Field of Classification Search
CPC . B62B 1/26; B62B 1/10; B60P 7/0807; B25H 3/00; B25H 3/02; B25H 3/04; Y10S 312/902
USPC .......................................... 211/85.8
See application file for complete search history.

(56) References Cited

U.S. PATENT DOCUMENTS

| | | | |
|---|---|---|---|
| D150,797 S * | 8/1948 | Lane | 211/70.1 |
| 4,240,684 A * | 12/1980 | Henning | B25H 3/02 312/125 |
| 5,052,601 A | 10/1991 | Carter | |
| 5,096,368 A * | 3/1992 | Butterfield | B62B 1/14 206/449 |
| D330,180 S | 10/1992 | Daves | |
| 5,333,885 A * | 8/1994 | Pullman | B62B 1/10 273/285 |
| 5,335,956 A * | 8/1994 | Panossian | A63B 47/00 211/14 |
| 5,346,063 A | 9/1994 | Chow | |
| 5,405,226 A | 4/1995 | Daves | |
| 5,437,502 A * | 8/1995 | Warnick | B25H 3/00 211/193 |
| 5,465,987 A * | 11/1995 | DellaVecchia | B62B 1/14 280/47.18 |
| 5,518,356 A * | 5/1996 | Krawczyk | B62B 1/14 280/47.18 |
| 5,887,819 A * | 3/1999 | Korn | B65H 49/325 242/129.6 |
| D425,304 S | 5/2000 | Yacobi | |
| 6,170,839 B1* | 1/2001 | Kizewski | B25H 3/00 280/47.19 |
| 6,877,753 B2* | 4/2005 | Anderson | B62B 1/26 280/47.18 |
| 7,628,281 B2 | 12/2009 | Sopel | |
| 8,973,766 B2 | 3/2015 | Sprang, Jr. | |
| 2009/0243240 A1* | 10/2009 | Boustred | B62B 1/14 280/47.19 |
| 2012/0055968 A1 | 3/2012 | Parker | |
| 2013/0223971 A1* | 8/2013 | Grace, IV | B65D 25/005 414/809 |

FOREIGN PATENT DOCUMENTS

CA 2691683 A1 8/2011

* cited by examiner

*Primary Examiner* — Ko Hung Chan
(74) *Attorney, Agent, or Firm* — Kyle A. Fletcher, Esq.

(57) ABSTRACT

The ratchet binder rack is a storage case that is designed for use with one or more ratchet binders. The ratchet binder rack stores the one or more ratchet binders in the storage case. The storage case is mounted on a hand truck such that the hand truck can be used to move the storage case. The ratchet binder rack comprises a storage case and a hand truck. The storage case is attached to the hand truck.

18 Claims, 5 Drawing Sheets

RATCHET BINDER RACK

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of workshop equipment and storage means for workshops, more specifically, a mobile rack configured for use with one or more ratchet binders.

SUMMARY OF INVENTION

The ratchet binder rack is a storage case that is designed for use with one or more ratchet binders. The ratchet binder rack stores the one or more ratchet binders in the storage case. The storage case is mounted on a hand truck such that the hand truck can be used to move the storage case.

These together with additional objects, features and advantages of the ratchet binder rack will be readily apparent to those of ordinary skill in the art upon reading the following detailed description of the presently preferred, but nonetheless illustrative, embodiments when taken in conjunction with the accompanying drawings.

In this respect, before explaining the current embodiments of the ratchet binder rack in detail, it is to be understood that the ratchet binder rack is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the ratchet binder rack.

It is therefore important that the claims be regarded as including such equivalent construction insofar as they do not depart from the spirit and scope of the ratchet binder rack. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
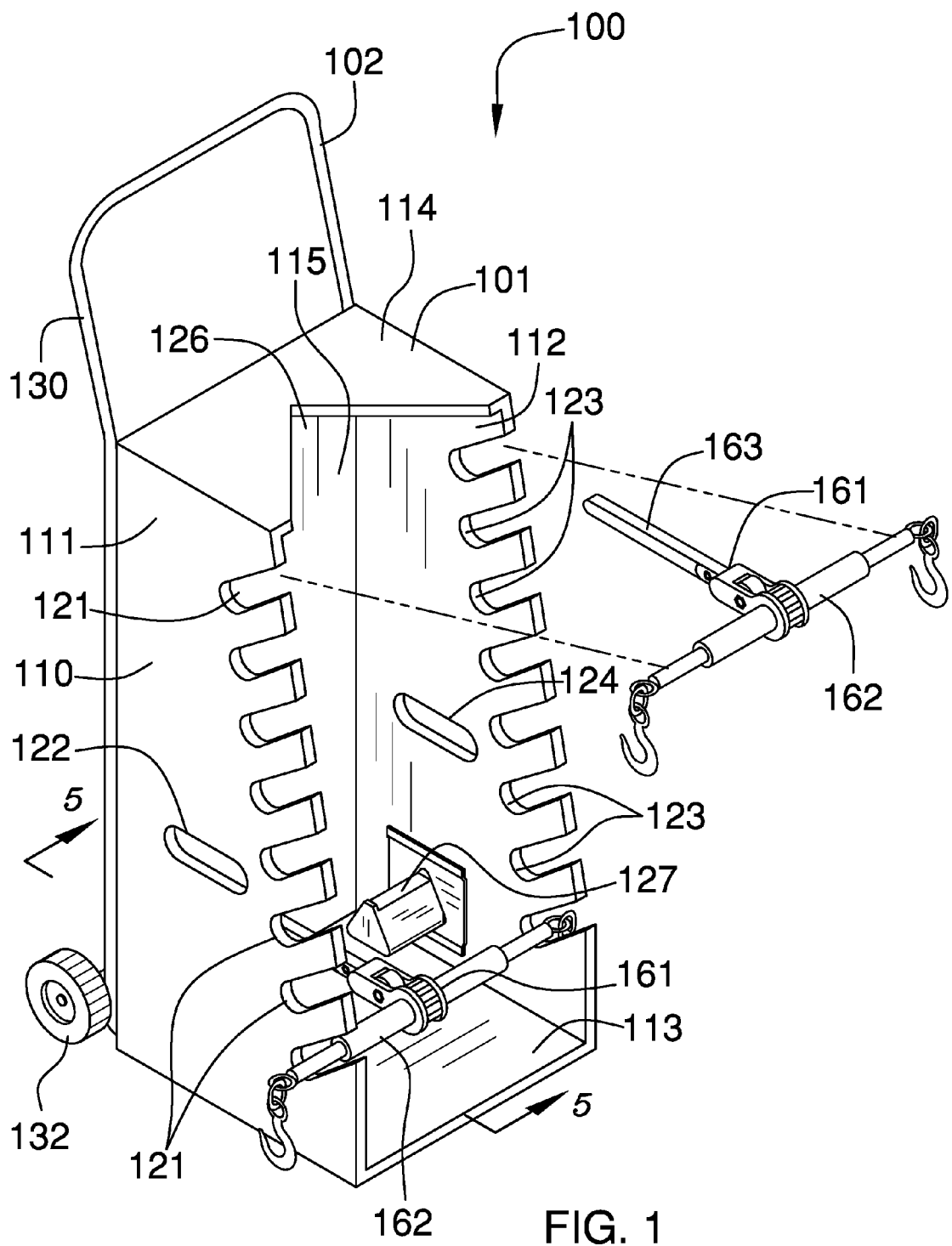
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The ratchet binder rack 100 (hereinafter invention) comprises a storage case 101 and a hand truck 102. The storage case 102 is attached to the hand truck 101. The invention 100 is a storage case 101 that is designed for use with one or more ratchet binders 161. The ratchet binder 161 comprises a ratchet bar 162 and a handle 163. The invention 100 stores the one or more ratchet binders 161 in the storage case 101. The storage case 101 is mounted on a hand truck 102 such that the hand truck 102 can be used to move the storage case 101.

The storage case 101 comprises a trapezoidal block 110. The trapezoidal block 110 is a cabinet structure that is formed in the shape of a hollow trapezoidal prism. As shown most clearly in FIGS. 1 and 2, the trapezoidal block 110 further comprises with a first wing 111, a second wing 112, a base panel 113, a top panel 114, and a rear panel 115.

The base panel 113 is a first rectangular plate that forms the face of the trapezoidal block 110 that is proximal to the supporting surface 164 upon which the invention 100 is placed. The top panel 114 is a second rectangular plate that forms the face of the trapezoidal block 110 that is distal from the base panel 113. As shown most clearly in FIG. 1, the top panel 114 further comprises an access port 126. The access port 126 is a triangularly shaped first negative space that is formed in the top panel 114. The triangularly shaped first negative space of the access port 126 is formed in the edge of the top panel 114 that is distal from the hand truck 102 such that a vertex triangularly shaped first negative space of the access port 126 is positioned at the center of the second rectangular plate that forms the top panel 114. The rear panel 115 is a third rectangular plate that attaches to both: 1) the edge of the top panel 114 that is proximal to the hand truck 102; and, 2) the edge of the base panel 113 that is proximal to the hand truck 102. When the invention 100 is assembled, the rear panel 115 is placed against the frame 130 of the hand truck 102. The hand truck 102 is discussed in more detail elsewhere in this disclosure. Methods to attach the rear panel 115 to the hand truck 102 are well known and documented in the mechanical arts.

The first wing 111 is a first trapezoidal plate that attaches to a side of the trapezoidal block 110 that is bounded by the top panel 114, the rear panel 115, and the base panel 113. The first wing 111 further comprises a first plurality of ratchet slots 121. Each of the first plurality of ratchet slots 121 is a second negative space that forms a groove within the first wing 111 from the edge of the first wing 111 that is distal from the rear panel 115 into the first wing 111 towards the rear panel 115 of the trapezoidal block 110. Each ratchet slot selected from the first plurality of ratchet slots 121 is parallel to the ratchet slots remaining in the first plurality of ratchet slots 121. Each ratchet slot selected from the first plurality of ratchet slots 121 is sized such that the ratchet bar 162 of the ratchet binder 161 will fit into the selected ratchet slot.

The second wing 112 is a second trapezoidal plate that attaches to a side of the trapezoidal block 110: 1) that is bounded by the top panel 114, the rear panel 115, and the base panel 113; and 2) that is the side of the trapezoidal block 110 that is distal to the side of the trapezoidal block 110 to which the first wing 111 attaches. The second wing 112 comprises a second plurality of ratchet slots 123. Each of the second plurality of ratchet slots 123 is a third negative space that forms a groove within the second wing 112 from the edge of the second wing 112 that is distal from the rear panel 115 into the second wing 112 towards the rear panel 115 of the trapezoidal block 110. Each ratchet slot selected from the second plurality of ratchet slots 123 parallel is to the ratchet slots remaining in the second plurality of ratchet slots 123. Each ratchet slot selected from the second plurality of ratchet slots 123 is sized such that the ratchet bar 162 of the ratchet binder 161 will fit into the selected ratchet slot. For any first ratchet slot selected from the first plurality of ratchet slots 121 there exists a corresponding second slot selected from the second plurality of ratchet slots 123. When a ratchet binder 161 is stored within the storage case 101, the ratchet bar 162 is placed within any first ratchet slot selected from the first plurality of ratchet slots 121 and the corresponding second ratchet slot selected from the second plurality of ratchet slots 123. When the trapezoidal block 110 is assembled, the second ratchet slot is positioned relative to the first ratchet slot such that when a ratchet bar 162 is inserted in both the first ratchet slot and the second ratchet slot for storage the ratchet bar 162 forms a line that is parallel to the base panel 113.

The first wing 111 further comprises a first handhold 122. The first handhold 122 is a first aperture that is formed in the first wing 111. The first handhold 122 is a gripping location that allows the invention 100 to be lifted by hand when necessary. The second wing 112 comprises a second handhold 124. The second handhold 124 is a second aperture that is formed in the second wing 112. The second handhold 124 is a gripping location that allows the invention 100 to be lifted by hand when necessary. In the first potential embodiment of the disclosure, as shown most clearly in FIGS. 1 and 5, the second wing 112 further comprises a J hook holder selected from one or more J hook holders 127. Each of the one or more J hook holders 127 is a triangular structure that perpendicularly projects into the interior of the storage case 101 from a surface selected from the group consisting of the first wing 111 or the second wing 112. Each of the one or more J hook holders 127 is a triangular structure from which the J hooks of the load chains associated with the ratchet binder 161 may be hung and stored when the ratchet binder is not in use.

The rear panel 115 comprises a plurality of handle holds 125. Each of the plurality of handle holds 125 is a third aperture that is formed in the rear panel 115. Each of the plurality of handle holds 125 is sized to receive and support the handle 163 of a ratchet binder 161. Each of the plurality of handle holds 125 corresponds to a first ratchet slot selected from the first plurality of ratchet slots 121 and its corresponding second ratchet slot selected from the second plurality of ratchet slots 123. Each of the plurality of handle holds 125 is positioned in the rear panel 115 such that: 1) when the ratchet bar 162 associated with a selected ratchet binder 161 is placed in a first ratchet slot selected from the first plurality of ratchet slots 121 and the first ratchet slot's corresponding second ratchet slot selected from the second plurality of ratchet slots 123; and, 2) the handle 163 of the selected ratchet binder 161 is placed in the handle hold selected from the plurality of handle holds 125; then, 3) the plane formed by the ratchet bar 162 and the handle 163 is parallel to the base panel 113.

To store a ratchet binder 161 within the storage case 101, the ratchet bar 162 is placed in a first ratchet slot selected from the first plurality of ratchet slots 121 and the corresponding second ratchet slot selected from the second plurality of ratchet slots 123 while the handle 163 is placed in the handle hold selected from the plurality of handle holds 125 that corresponds to the selected first ratchet slot and the corresponding second ratchet slot.

The hand truck 102 comprises a frame 130, a first wheel 131, a second wheel 132, an axle 133, and a tip bar 134.

The frame 130 is a rounded rectangular structure. The frame 130 comprises a first tube 141, a second tube 142, a third tube 143, a fourth tube 144, a fifth tube 145, a sixth tube 146, and a seventh tube 147. The first tube 141 is a readily and commercially available metal tube that is further defined with a first end 171 and a second end 172. The second tube 142 is a readily and commercially available metal tube that is further defined with a third end 173 and a fourth end 174. The third tube 143 is a readily and commercially available metal tube that is further defined with a fifth end 175 and a sixth end 176. The fourth tube 144 is a readily and commercially available metal tube that is further defined with a seventh end 177 and an eighth end 178. The fifth tube 145 is a readily and commercially available metal tube that is further defined with a ninth end 179 and a tenth end 180. The sixth tube 146 is a readily and commercially available metal tube that is further defined with an eleventh end 181 and a twelfth end 182. The seventh tube 147 is a readily and commercially available metal tube that is further defined with a thirteenth end 183 and a fourteenth end 184.

The frame 130 is assembled as described in this paragraph. The first end 171 of the first tube 141 attaches to the eighth end 178 of the fourth tube 144 to form a rounded corner. The second end 172 of the first tube 141 attaches to the third end 173 of the second tube 142 to form a rounded corner. The fourth end 174 of the second tube 142 attaches to the fifth end 175 of the third tube 143 to form a rounded corner. The sixth end 176 of the third tube 143 attaches to the seventh end 177 of the fourth tube 144 to form a rounded corner. The eleventh end 181 of the sixth tube 146 attaches to the center of the fourth tube 144. The twelfth end 182 of the sixth tube 146 attaches to the center of the second tube 142. The ninth end 179 of the fifth tube 145 attaches to the fourth tube 144 between the eighth end 178 of the fourth tube 144 and the eleventh end 181 of the sixth tube 146. The tenth end 180 of the fifth tube 145 attaches to the second tube 142 between the third end 173 of the second tube 142 and the twelfth end 182 of the sixth tube 146. The thirteenth end 183 of the seventh tube 147 attaches to the fourth tube 144 between the seventh end 177 of the fourth tube 144 and the eleventh end 181 of the sixth tube 146. The fourteenth end 184 of the seventh tube 147 attaches to the second tube 142 between the fourth end 174 of the second tube 142 and the twelfth end 182 of the sixth tube 146. The sixth tube 146 is parallel to the first tube 141 and the third tube 143. The sixth tube 146 is perpendicular to the second tube 142 and the fourth tube 144. The fifth tube 145 is parallel to the sixth tube 146. The seventh tube 147 is parallel to the sixth tube 146. Methods to make the attachments described in this paragraph are well known and documented in the mechanical arts and include, but are not limited to brazing and welding. Methods to bend metal tubes are well known and documented in the mechanical arts.

The first wheel 131 and the second wheel 132 are attached to the axle 133 to form a wheel assembly. As shown most clearly in FIG. 3, the wheel assembly is attached to the frame 130 such that the first wheel 131 rests on the supporting surface 164 such that the first wheel 131 is next to the rounded corner formed by the sixth end 176 of the third tube 143 and the seventh end 177 of the fourth tube 144. The wheel assembly is further attached to the frame 130 such that the second wheel 132 rests on the supporting surface 164 such that the second wheel 132 is next to the rounded corner formed by the fourth end 174 of the second tube 142 and the fifth end 175 of the third tube 143.

The tip bar 134 is a tipping lever that is attached to the third tube 143 such that the tip bar 134 projects away from the third tube 143 in a direction away from the storage case 101 in a direction that is perpendicular to the second tube 142 and the fourth tube 144. The purpose of the tip bar 134 is to provide a lever that can be used to rotate the invention 100 around the wheel assembly.

Figure 2:
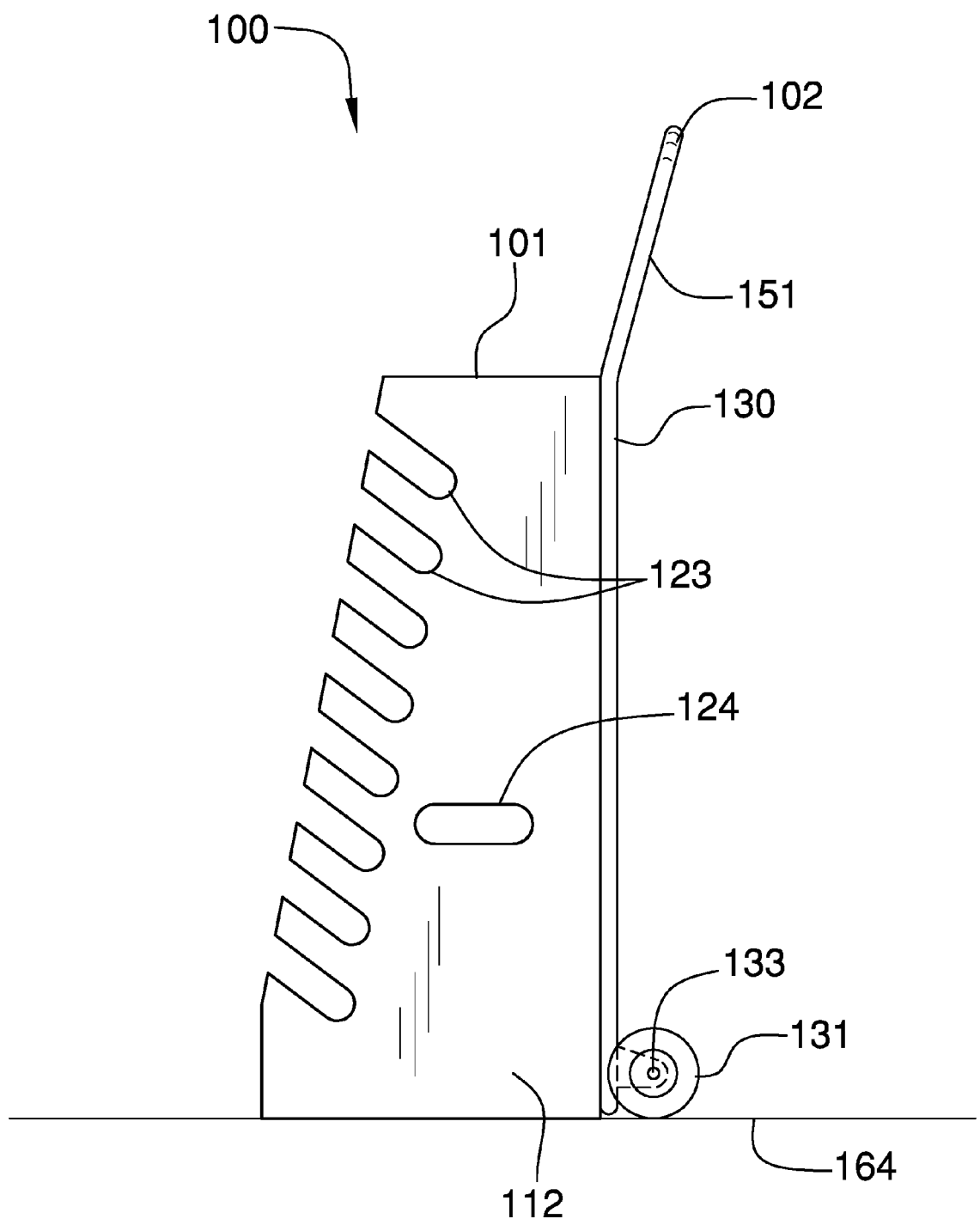
FIG. 2 is a side view of an embodiment of the disclosure.
Figure 3:
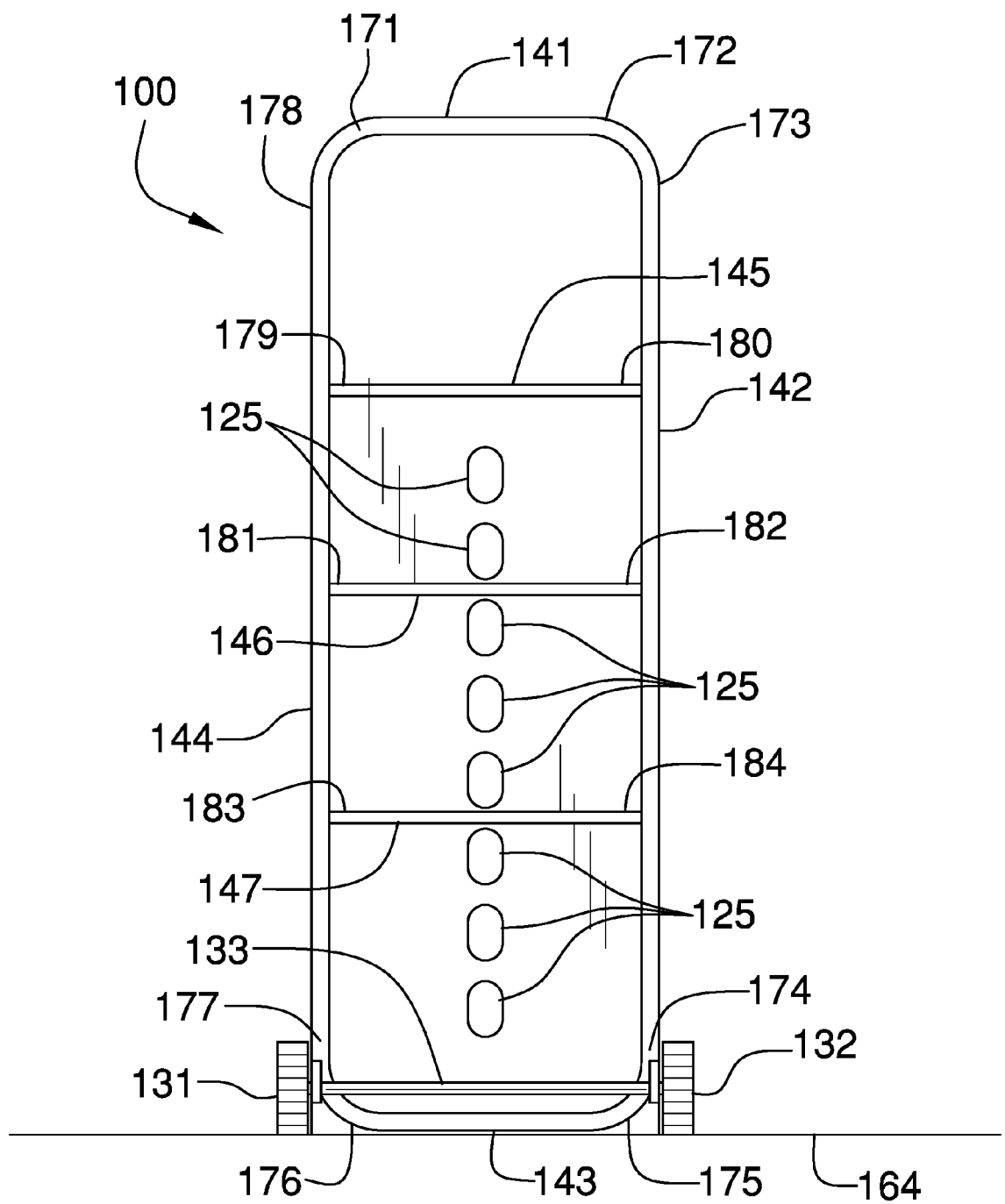
FIG. 3 is a rear view of an embodiment of the disclosure.
Figure 4:
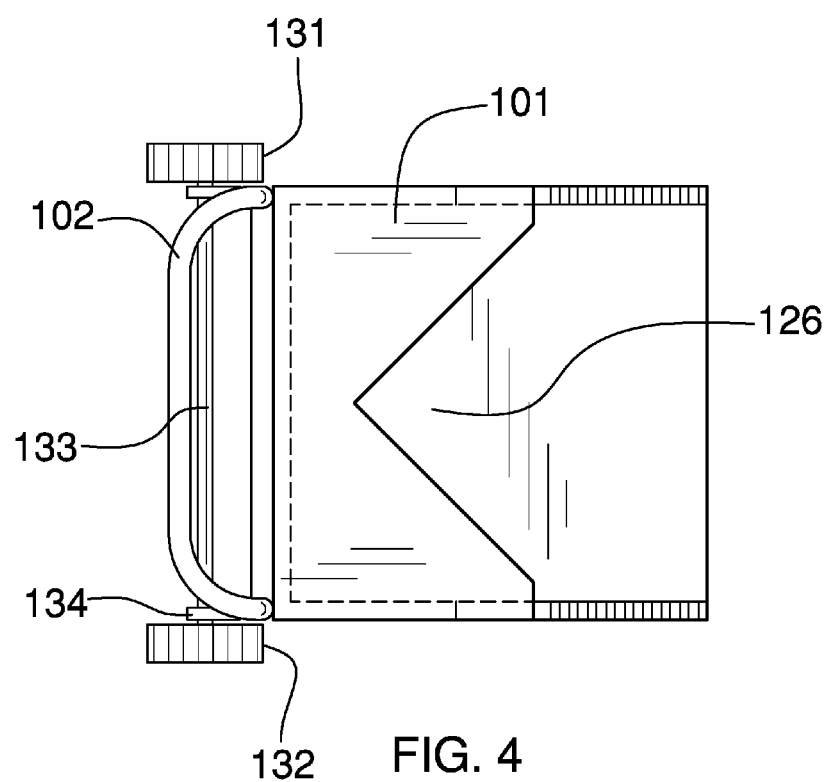
FIG. 4 is a top view of an embodiment of the disclosure.
Figure 5:
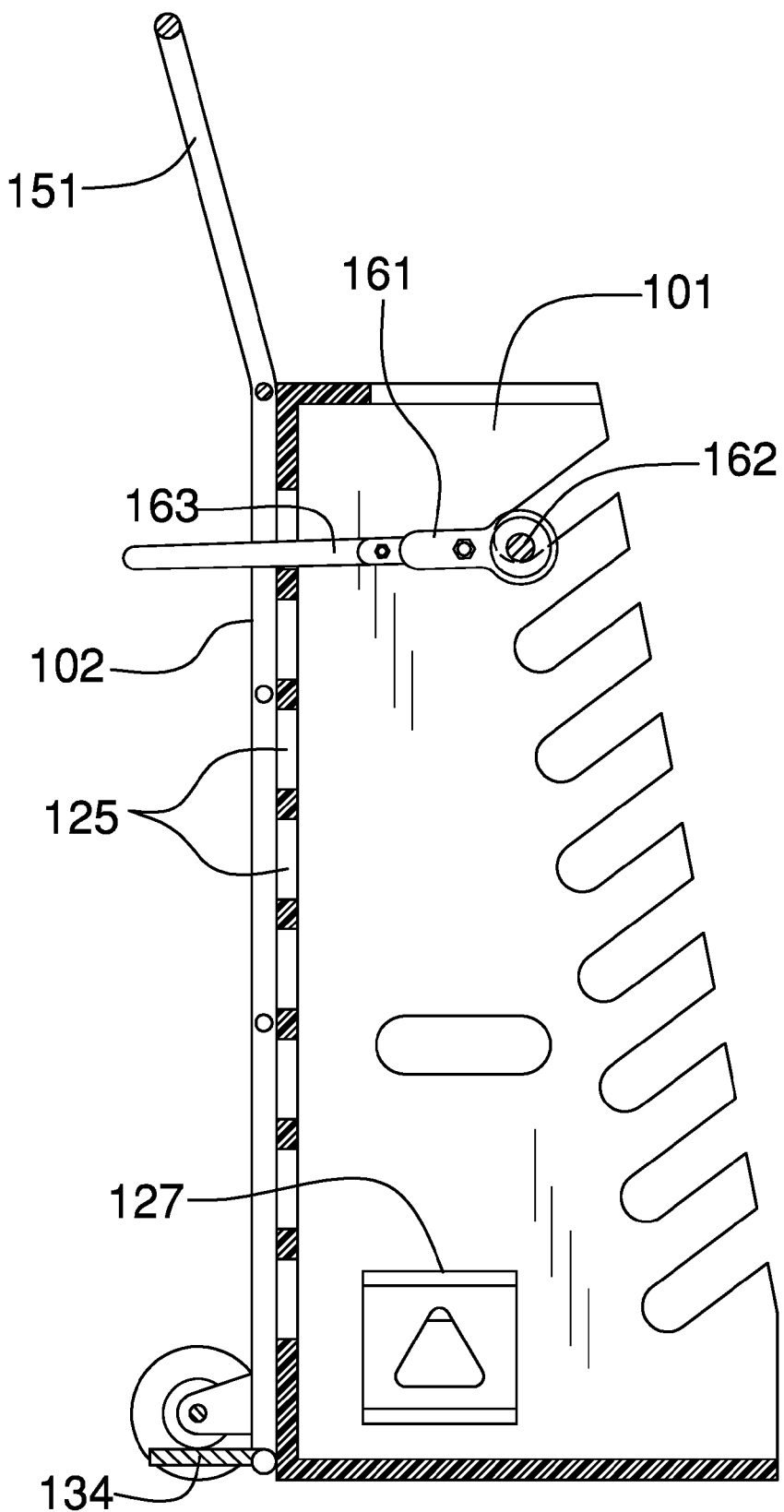
FIG. 5 is a cross-sectional view of an embodiment of the disclosure across 5-5 as shown in FIG. 1.

In a second potential embodiment of the disclosure, as shown most clearly in FIGS. 2 and 5, the second tube 142 and the fourth tube 144 are formed with a flair 151 such that the sections of the second tube 142 and the fourth tube 144 from between the fifth tube 145 and the first tube 141 are bent, or flair 151, away from the storage case 101. This flair 151 provides additional leverage when rotating the invention 100 around the wheel assembly.

The following definitions were used in this disclosure:

Axle: As used in this disclosure, an axle is a cylindrical shaft that is inserted through the center of one or more wheels such that the center axis of the one or more wheels and the center axis of the axle are aligned.

Correspond: As used in this disclosure, the term correspond means that a first object is in some manner linked to a second object in a one to one fashion.

Hand Truck: As used in this disclosure, a hand truck is a two wheel frame that is used for transporting loads. Specifically, the load supported on a frame that can be rotated around the two wheels such that the weight of the load is supported via the two wheels thus allowing the rotation of the wheels to move the load.

Negative Space: As used in this disclosure, negative space is a method of defining an object through the use of open or empty space as the definition of the object itself, or, through the use of open or empty space to describe the boundaries of an object.

Prism: As used in this disclosure, a prism is a 3 dimensional geometric structure wherein: 1) the form factor of two faces of the prism correspond to each other; and, 2) the two corresponding faces are parallel to each other. In this disclosure, when further description is required a prism will be named for the geometric or descriptive name of the form factor of the two corresponding faces. If the form factor of the two corresponding faces has no clearly established or well-known geometric or descriptive name, the term irregular prism will be used.

Rounded Rectangle: A used in this disclosure, a rounded rectangle is a rectangle wherein each corner structure of the rectangle is replaced with a quarter circle wherein the concave portion of the quarter circle faces the center of the rounded rectangle.

Slot: As used in this disclosure, a slot is a long narrow groove or aperture that is formed in an object.

Tipping Lever: As used in this disclosure, a tipping lever is a rod of a hand truck that extends from underneath the hand truck in the direction behind the load of the hand truck. Using the wheels of the hand truck as a pivot point, the tipping lever acts as a lever that when stepped on makes it easier to raise the load of the hand truck.

Trapezoid: As used in this disclosure, a trapezoid is a quadrilateral with one pair of parallel sides. An isosceles trapezoid is a trapezoid for which a line exists that: 1) intersects opposite sides of the trapezoid; and, 2) bisects the trapezoid into two congruent shapes or structures.

Wheel: As used in this disclosure, a wheel is a circular object that revolves around an axle or an axis and is fixed below an object to enable it to move easily over the ground. For the purpose of this disclosure, it is assumed that a wheel can only revolve in a forward and a backward direction.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A portable cabinet comprising:
a storage case and a hand truck;
wherein the storage case is attached to the hand truck;
wherein the portable cabinet is adapted for use with one or more ratchet binders;
wherein each of the one or more ratchet binders comprises a ratchet bar and a handle;
wherein the portable cabinet stores the one or more ratchet binders in the storage case;
wherein the storage case is mounted on the hand truck such that the hand truck can be used to move the storage case;
wherein the storage case comprises a trapezoidal block;
wherein the trapezoidal block is a cabinet structure that is formed in the shape of a hollow trapezoidal prism;
wherein the trapezoidal block further comprises with a first wing, a second wing, a base panel, a top panel, and a rear panel;
wherein the base panel is a first rectangular plate that forms the face of the trapezoidal block that is proximal to a supporting surface upon which the portable cabinet is placed;

wherein the top panel is a second rectangular plate that forms the face of the trapezoidal block that is distal from the base panel;

wherein the top panel further comprises an access port;

wherein the access port is a triangularly shaped first negative space that is formed in the top panel.

2. The portable cabinet according to claim 1 wherein the trapezoidal block further comprises the rear panel;

wherein the rear panel is a third rectangular plate;

wherein the rear panel attaches to the edge of the top panel that is proximal to the hand truck;

wherein the rear panel attaches to the edge of the base panel that is proximal to the hand truck;

wherein the rear panel is attached to the hand truck.

3. The portable cabinet according to claim 2 wherein the trapezoidal block further comprises the first wing and the second wing;

wherein the first wing is a first trapezoidal plate that attaches to a side of the trapezoidal block that is bounded by the top panel, the rear panel, and the base panel;

wherein the first wing further comprises a first plurality of ratchet slots;

wherein each of the first plurality of ratchet slots is a second negative space that forms a groove within the first wing from the edge of the first wing that is distal from the rear panel into the first wing towards the rear panel of the trapezoidal block;

wherein each ratchet slot selected from the first plurality of ratchet slots is parallel to the ratchet slots remaining in the first plurality of ratchet slots;

wherein each ratchet slot selected from the first plurality of ratchet slots is sized such that the ratchet bar of the ratchet binder will fit into the selected ratchet slot;

wherein the second wing is a second trapezoidal plate that attaches to a side of the trapezoidal block that is bounded by the top panel, the rear panel, and the base panel;

wherein the second wing is a second trapezoidal plate that attaches to a side of the trapezoidal block that is the side of the trapezoidal block that is distal to the side of the trapezoidal block to which the first wing attaches;

wherein the second wing comprises a second plurality of ratchet slots;

wherein each of the second plurality of ratchet slots is a third negative space that forms a groove within the second wing from the edge of the second wing that is distal from the rear panel into the second wing towards the rear panel of the trapezoidal block;

wherein each ratchet slot selected from the second plurality of ratchet slots parallel is to the ratchet slots remaining in the second plurality of ratchet slots;

wherein each ratchet slot selected from the second plurality of ratchet slots is sized such that the ratchet bar of the ratchet binder will fit into the selected ratchet slot.

4. The portable cabinet according to claim 3 wherein for any first ratchet slot selected from the first plurality of ratchet slots there exists a corresponding second slot selected from the second plurality of ratchet slots;

wherein when a ratchet binder selected from the one or more ratchet binders is stored within the storage case, the ratchet bar is placed within any first ratchet slot selected from the first plurality of ratchet slots and the corresponding second ratchet slot selected from the second plurality of ratchet slots;

wherein the second ratchet slot is positioned relative to the first ratchet slot such that when a ratchet bar is inserted in both the first ratchet slot and the second ratchet slot for storage the ratchet bar forms a line that is parallel to the base panel.

5. The portable cabinet according to claim 4 wherein the first wing further comprises a first handhold;

wherein the first handhold is a first aperture that is formed in the first wing;

wherein the second wing comprises a second handhold;

wherein the second handhold is a second aperture that is formed in the second wing.

6. The portable cabinet according to claim 5 wherein the rear panel comprises a plurality of handle holds;

wherein each of the plurality of handle holds is a third aperture that is formed in the rear panel;

wherein each of the plurality of handle holds is sized to receive and support the handle of a ratchet binder.

7. The portable cabinet according to claim 6 wherein each of the plurality of handle holds corresponds to a first ratchet slot selected from the first plurality of ratchet slots and its corresponding second ratchet slot selected from the second plurality of ratchet slots.

8. The portable cabinet according to claim 7 wherein to store a ratchet binder within the storage case, the ratchet bar is placed in a first ratchet slot selected from the first plurality of ratchet slots and the corresponding second ratchet slot selected from the second plurality of ratchet slots while the handle is placed in the handle hold selected from the plurality of handle holds that corresponds to the selected first ratchet slot and the corresponding second ratchet slot.

9. The portable cabinet according to claim 8 wherein the plane formed by the ratchet bar and the handle of a properly stored ratchet binder is parallel to the base panel.

10. The portable cabinet according to claim 9 wherein the hand truck comprises a frame, a first wheel, a second wheel, an axle, and a tip bar;

wherein the frame is a rounded rectangular structure;

wherein the first wheel, the second wheel, the axle and the tip bar are attached to the frame.

11. The portable cabinet according to claim 10 wherein the frame comprises a first tube, a second tube, a third tube, a fourth tube;

wherein the first tube, the second tube, the third tube, and the fourth tube are interconnected;

wherein the first tube is first metal tube that is further defined with a first end and a second end;

wherein the second tube is a second metal tube that is further defined with a third end and a fourth end;

wherein the third tube is a third metal tube that is further defined with a fifth end and a sixth end;

wherein the fourth tube is a fourth metal tube that is further defined with a seventh end and an eighth end.

12. The portable cabinet according to claim 11 wherein the first end of the first tube attaches to the eighth end of the fourth tube;

wherein the second end of the first tube attaches to the third end of the second tube;

wherein the fourth end of the second tube attaches to the fifth end of the third tube;

wherein the sixth end of the third tube attaches to the seventh end of the fourth tube.

13. The portable cabinet according to claim 12
wherein the frame further comprises a fifth tube, a sixth tube, and a seventh tube;
wherein the second tube, the fourth tube, the fifth tube, the sixth tube, and the seventh tube are interconnected;
wherein the fifth tube is a fifth metal tube that is further defined with a ninth end and a tenth end;
wherein the sixth tube is a sixth available metal tube that is further defined with an eleventh end and a twelfth end;
wherein the seventh tube is a seventh metal tube that is further defined with a thirteenth end and a fourteenth end.

14. The portable cabinet according to claim 13
wherein the eleventh end of the sixth tube attaches to the center of the fourth tube;
wherein the twelfth end of the sixth tube attaches to the center of the second tube;
wherein the ninth end of the fifth tube attaches to the fourth tube between the eighth end of the fourth tube and the eleventh end of the sixth tube;
wherein the tenth end of the fifth tube attaches to the second tube between the third end of the second tube and the twelfth end of the sixth tube;
wherein the thirteenth end of the seventh tube attaches to the fourth tube between the seventh end of the fourth tube and the eleventh end of the sixth tube;
wherein the fourteenth end of the seventh tube attaches to the second tube between the fourth end of the second tube and the twelfth end of the sixth tube
wherein the sixth tube is parallel to the first tube and the third tube;
wherein the sixth tube is perpendicular to the second tube and the fourth tube;
wherein the fifth tube is parallel to the sixth tube;
wherein the seventh tube is parallel to the sixth tube.

15. The portable cabinet according to claim 14
wherein the first end of the first tube attaches to the eighth end of the fourth tube to form a rounded corner;
wherein the second end of the first tube attaches to the third end of the second tube to form a rounded corner;
wherein the fourth end of the second tube attaches to the fifth end of the third tube to form a rounded corner;
wherein the sixth end of the third tube attaches to the seventh end of the fourth tube to form a rounded corner.

16. The portable cabinet according to claim 15
wherein the first wheel and the second wheel are attached to the axle to form a wheel assembly;
wherein the wheel assembly is attached to the frame such that the first wheel rests on the supporting surface such that the first wheel is next to the rounded corner formed by the sixth end of the third tube and the seventh end of the fourth tube;
wherein the wheel assembly is further attached to the frame such that the second wheel rests on the supporting surface such that the second wheel is next to the rounded corner formed by the fourth end of the second tube and the fifth end of the third tube;
wherein the tip bar is a tipping lever that is attached to the third tube such that the tip bar projects away from the third tube in a direction away from the storage case in a direction that is perpendicular to the second tube and the fourth tube.

17. The portable cabinet according to claim 16 wherein in a second potential embodiment of the disclosure, the second tube and the fourth tube are formed with a flair such that the sections of the second tube and the fourth tube from between the fifth tube and the first tube flair away from the storage case.

18. The portable cabinet according to claim 17 wherein the triangularly shaped first negative space of the access port is formed in the edge of the top panel that is distal from the hand truck such that a vertex triangularly shaped first negative space of the access port is positioned at the center of the second rectangular plate that forms the top panel.

\* \* \* \* \*